United States Patent Office 2,748,186
Patented May 29, 1956

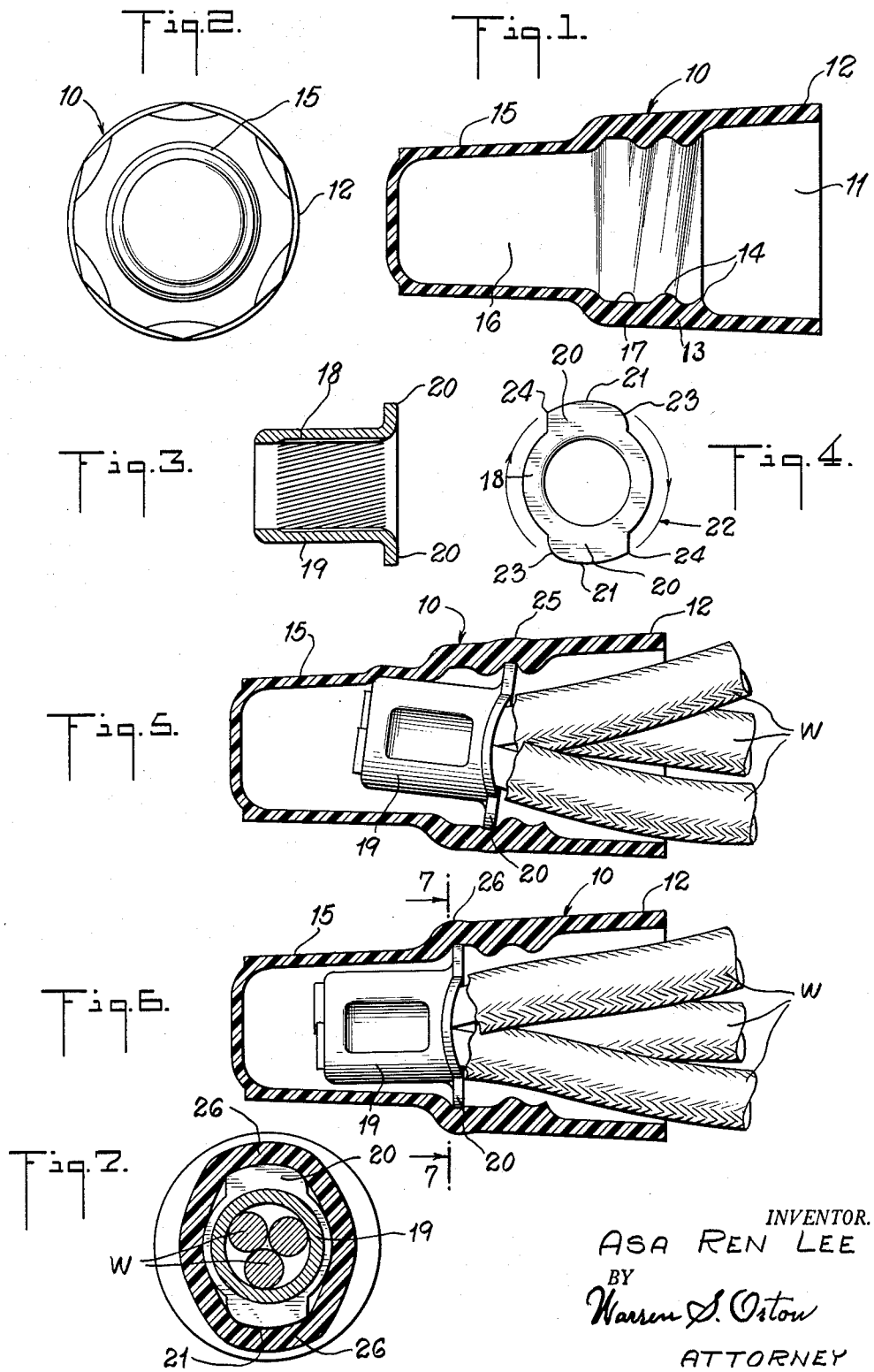

2,748,186

TWO-PIECE PIGTAIL CONNECTOR

Asa Ren Lee, Cranford, N. J., assignor to The Thomas & Betts Co., Elizabeth, N. J., a corporation of New Jersey Application December 20, 1954, Serial No. 476,407

8 Claims. (Cl. 174—87)

The invention relates in general to an improvement in that class of electric connectors in which a plurality of bared ends of wire conductors are crimped in a metallic splicing sleeve and the sleeve with the wires attached thereto is screwed into a protective insulator cap, which form of connector is usually identified in the trade as a pigtail connector or splicer.

The present disclosure constitutes a development of the disclosure in the patent to Graham and Thompson, No. 2,589,368, March 11, 1952. In this patent the splicing sleeve is provided with a pair of outstanding lobes which form a mutilated thread in screw-threaded engagement with internal threads on the cap and wherein the lobes at the end of their screw-threaded advance into the cap are jammed between two succeeding turns of the threads on the more or less rigid cap.

In actual practice it sometimes happens that vibrations and other forces acting on connectors of the type disclosed in the above-mentioned patent tend to loosen the threaded connection between the sleeve and the cap, resulting in disconnecting the same. There is no objection to a freedom of relative movement of the sleeve and cap after the sleeve has reached its innermost position in the cap and it is required that the cap be unscrewed from the sleeve to permit inspection and repairs, but there is, of course, an objection to any possible accidental unscrewing of the sleeve from the cap.

The primary object of the invention is to provide a form of connection between the sleeve crimped onto its conductors and its protective cap which will permit an intentional forceful screwing in both rotary directions of the cap and sleeve to provide when turning in one direction for the locating of the sleeve in the cap and when turning in the reverse direction to provide for releasing the sleeve from the cap, but which will resist accidental unscrewing of the cap from the sleeve.

Another object of the invention is to provide a pigtail connector of the type described which will signal to the operator when the sleeve has reached its intended fully advanced position concealed in the cap.

Broadly, these objectives are attained by two physical features distinctive over the showing in the Graham and Thompson patent above mentioned. The cap is made of a rubber-like material capable of being elastically distended by the lobes of the sleeve as the sleeve is advanced and the groove between the threads of the cap run off at its inner end into an annular channel to receive the lobes of the sleeve. The diametrical dimensions of the channel and lobes are so related that the reactory radial squeeze pressure of the cap on the lobes and thus the resistance to the rotation of the cap on the sleeve is released at least partially as the lobes are advanced passing out from the end of the threads on the cap into the channel at the inner end of the threads.

Various other objects and advantages of the invention will be in part obvious from an inspection of the accompanying drawings and in part will be more fully set forth in the following particular description of one form of two-piece pigtail connector, and the invention also consists in certain new and novel features of construction and combination of parts hereinafter set forth and claimed.

In the accompanying drawings:

Fig. 1 is a view in axial section of a cap formed of elastic material and forming the cap element of a preferred embodiment of the invention;

Fig. 2 is a left end view of the molded cap shown in Fig. 1;

Fig. 3 is an axial sectional view of the metallic sleeve element of the invention;

Fig. 4 is an end view of the crimpable sleeve element showing details of the outstanding lobes;

Fig. 5 is a view in axial section of the sleeve of Fig. 3 crimped onto wire conductors and partly inserted into the cap of Fig. 1 and with its lobes in engagement with and dilating the threaded portion of the cap;

Fig. 6 is a similar view with the sleeve fully advanced and with its lobes located in the annular channel and showing the lobes distending the portion of the cap encircling the channel; and Fig. 7 is a transverse view taken on the line 7—7 of Fig. 6 looking in the direction indicated by the arrows.

In the drawings and referring first to Fig. 1, there is shown a hollow cap 10 molded of a rubber-like material of tough, light-weight, high dielectric strength plastic, having capacity to be dilated outwardly and having plastic memory to return to its molded form when dilated therefrom. In the instant case the material used in the cap illustrated is thermoplastic.

The cap in the form illustrated may be considered as being formed of three parts, an enlarged, inwardly tapered entrance end portion 11 forming a skirt 12, an intermediate portion 13 provided interiorly with spiral threads 14 molded therein, and a sleeve housing portion 15. Between the inner end of the threaded portion 13 and the housing portion 15 the wall outlining the bore 16 is provided with an annular channel 17 which opens from the trough formed by the threads 14. The threads and thus their troughs taper inwardly towards the axis of the bore from the end at the skirt 12 towards the inner end of the threaded portion.

In Figs. 3 and 4 is shown a metal sleeve 18 including a cylindrical barrel 19 fashioned to be crimped onto the bare ends of wires W and screwed into the cap to locate the barrel housed in the closed end portion 15 of the bore 16. The sleeve is provided at one end with a pair of outstanding lobes 20 slightly twisted and forming a mutilated thread fashioned for a screwthreaded engagement in the trough formed between the turns of the threads 14.

The outer edges 21 of the lobes define a circle of reference 22. The advance corners of each of the lobes are rounded as shown at 23 in the direction of turning of the sleeve inwardly into the bore to facilitate the inward screwing action of the sleeve, and the other or trailing corners 24 form a right angle and are thus sharp. These sharp corners have a tendency on any reverse turning of the sleeve to escape from the cap to bite into the resilient material forming the bottom of the troughs between the threads 14. In this way it is easier to advance the sleeve into the cap with a clockwise movement than to withdraw the sleeve from the cap in a counter-clockwise direction as viewed in Fig. 4.

A particularly distinctive feature of this disclosure is in the relation of the diameter of the lobes and thus the diameter of the circle of reference 22 relative to the diameters of the troughs between the threads, particularly at their discharge end, and the diameter of the annular channel 17.

The diameter of the lobes as measured in the vertical axis of Fig. 4 is not greater than, and is preferably less than, the entrance end of the threaded portion of the cap to facilitate an easy entrance of the lobes between the threads at the start of the screwing operation and at this time the sleeve is free to rotate without any restraint from the cap.

Just after the lobes have entered the threaded portion they bear outwardly on the wall of the cap distending the same slightly as suggested at 25 in Fig. 5, and by reaction the part of the elastic wall so distended reacts with a squeeze pressure radially on the outer edges 21 of the lobes to resist the rotation of the sleeve. As the threaded portion is tapered inwardly this resistance gradually increases with the approach of the lobes towards the inner end of the threaded portion 13.

The diameter of the annular channel 17 as molded is slightly greater than the diameter of the lobes, but less than the diameter of the troughs formed between the threads at the discharge end opening into the annular channel.

By reason of this construction the operator feels a sudden release of resistance to the advance of the sleeve as the lobes move from the threads into the annular channel. As the lobes while in the channel 17 are not held between the adjacent sides of the threads the operator feels a greater freedom laterally than while the lobes were in the threaded portion. This relative release of restraint advises the operator that the sleeve has been advanced to its position in the cap intended by the manufacturer and as shown in Fig. 6.

When in this intended position the portion of the cap which encircles the distending lobes is bellied outward slightly as shown at 26 in Figs. 6 and 7 and this distended portion reacts by reason of its plastic memory to squeeze the lobes therebetween at least slightly. This creates a frictional resistance to the lobes turning accidentally while in the channel and, at the same time, provides a restrained freedom of rotary movement between the sleeve and the cap should outside conditions tend to rotate the cap on the assembly of sleeve and the bundle of wires W.

It is within the scope of the disclosure to make the diameter of the channel 17 equal to or even greater than the diameter of the lobes, thus increasing the freedom of rotation of the lobes in the channel while retaining the signal features of the disclosure.

When the lobes are received in the channel the portion of the cap which contains the channel takes the elliptical form shown in Fig. 7 and slightly exaggerated to bring out the distinctive elliptical form. This elliptical contour causes the part of the cap which lies between the lobes as viewed in Fig. 7 to move inwardly to fill up the spaces on the sleeve considered circularly which lie initially between the lobes, and this further tends to resist relative rotation of cap and sleeve.

I claim:

1. In a device of the class described, the combination of two preformed elements in telescopic relation, the inner of said two elements constituting a metallic splicer sleeve, a portion of which is of cylindrical form and fashioned to be crimped onto conductors in its bore before the sleeve is inserted in the outer element, said sleeve provided at one end with a pair of diametrically extending outstanding lobes disposed substantially in a plane extending at right angles to the axis of the sleeve and whose outer edges define a circle of greater diameter than the cylindrical part, the outer of said two elements forming a molded cap of resilient insulating material having a bore open at one end for receiving the sleeve, a mid-length portion of said bore being provided with a spiral, tapered thread forming between its turns a groove of progressively less diameter from its entrance end toward its discharge end, and in which groove the lobes turn with a screw-threaded engagement, the entrance end of the spiral groove having a diameter slightly greater than said lobe-forming circle and its other end having a diameter less than that of said circle, and said mid-length portion of the bore on the side of the groove opposite its receiving end provided with an annular channel for receiving the lobes when discharged from the groove, and said channel having a diameter slightly greater than the least diameter of the groove and slightly greater than the lobe-forming circle, the portion of the molded cap containing the channel being deformed outwardly by reason of the distending action of the lobes therein, and said cap in its resilient tendency to revert to its initial form frictionally binding on the lobes in the channel to resist accidental unscrewing of the sleeve in the cap.

2. A pigtail splicer comprising two telescoped members, the outer member formed of an insulating elastic material and having a bore provided with internal threads, the inner member provided with a pair of diametrically related outstanding lobes having a screw-threaded engagement with the threads of the bore, the outer edges of the lobes defining a circle of reference, the wall outlining the bore having an annular channel into which the outer edges of the lobes discharge from their threaded engagement with the outer member and said lobes having a restrained freedom of rotary movement when in said annular channel, the diameter of the channel when free of the lobes being slightly less than said lobe-forming circle, the part of the outer member containing the channel being elastically distended by virtue of the lobes therein pressing outwardly on said part, and said distended part reacting resiliently on the lobes radially with a squeeze action sufficient to resist frictionally any accidental escape of the lobes backward out of the channel into the threaded portion of the outer member.

3. An article of manufacture including an outer hollow cap having an open end and formed of elastic insulating material, and an inner metallic sleeve of ductile material adapted to be crimped onto conductors intruded into its bore, said sleeve inserted into the cap through the open end of the cap, said sleeve provided with a pair of diametrically related, rigid, outstanding lobes and a portion of the bore of the cap being tapered inwardly from the open end and provided with internal threads, the lobes and threads providing a screw engagement between the cap and the sleeve, the wall of the bore at the end of its threads opposite the open end of the cap provided with an annular channel into which the lobes discharge from their screw engagement with the threads, and the portion of the cap which contains the channel exerting a squeeze pressure engagement on the lobes sufficient to resist frictionally the otherwise free rotary movement of the lobes while in the channel.

4. A pigtail connector including two preformed members for insertion one into the other in telescopic relation, the outer member forming a cap molded from an elastic rubber-like material and having a bore with its wall having a spiral thread forming a spiral groove between the turns of the thread, and said wall having an annular groove into which the spiral groove discharges, and the inner member forming a sleeve having a barrel adapted to be crimped onto conductors therein, said barrel provided with a pair of outstanding lobes forming a mutilated thread having a screw-threaded engagement in the spiral groove and discharging therefrom into the annular channel.

5. The pigtail connector defined in claim 4, wherein the diameter of the sleeve at the lobes being slightly greater than the diameter of the annular groove and said lobes acting when in the annular groove to distend the part of the cap containing the annular groove, and the part of the cap so distended reacting resiliently on the lobes with a squeeze pressure to restrain the otherwise freedom of rotary movement of the lobes while in the annular groove.

6. In a pigtail connector, the combination of two preformed members in telescopic relation, the outer member formed of an elastic insulating material having a bore whose wall is provided with a spiral thread forming a spiral groove between the turns of the thread, the inner member provided with a pair of outstanding lobes in screw-threaded engagement with the bottom of the trough and with the perimeters of the lobes defining a circle of reference of greater diameter than the diameter of the trough in the discharge portion thereof, the advancing corners of the perimeters being rounded to facilitate the turning movement of the lobes as they are advanced into the outer member, and the trailing corners of the lobe perimeters being sharply angled to bite into the elastic material at the bottom of the trough to resist unscrewing of the inner member out of the outer member.

7. In a pigtail connector, the combination of two preformed members in telescopic relation, the outer member formed of an elastic insulating material having a bore whose wall is provided with a spiral thread forming a spiral groove between the turns of the thread, and said wall provided with an annular groove into which the spiral groove discharges, the inner member forming a sleeve provided with a pair of lobes forming a screw-threaded engagement with the spiral groove and discharging therefrom into the annular groove, the diameter of the sleeve at the lobes being greater than the diameter of the spiral groove at the end where it discharges into the annular groove, and the diameter of the annular groove being greater than the diameter of the spiral groove at the end where it discharges into the annular groove.

8. The pigtail connector defined in claim 7, wherein the lobes while in the annular groove and in the adjacent end of the spiral groove bear outwardly on the parts surrounding said annular groove and the said spiral groove end, and said parts bearing inwardly on the lobes to resist relative rotation between the members, with the resistance to rotation while the lobes are in the annular groove being less than when the lobes are in the adjacent end of the spiral groove.

References Cited in the file of this patent
UNITED STATES PATENTS

| | | |
|---|---|---|
| 2,560,683 | Buchanan | July 17, 1951 |
| 2,589,368 | Graham et al. | Mar. 18, 1952 |
| 2,701,273 | Badeau | Feb. 1, 1955 |